United States Patent [19]

Belz

[11] Patent Number: 4,576,780
[45] Date of Patent: Mar. 18, 1986

[54] RELEASABLE ANTI-EJECTION DEVICE FOR THE CONTROL RODS OF A NUCLEAR REACTOR

[75] Inventor: Gérard Belz, Vinon sur Verdon, France

[73] Assignee: Commissariat a l'Energie Atomique, France

[21] Appl. No.: 486,313

[22] Filed: Apr. 19, 1983

[30] Foreign Application Priority Data

Apr. 26, 1982 [FR] France ............................ 82 07139

[51] Int. Cl.⁴ .............................................. G21C 7/08
[52] U.S. Cl. .................................. 376/235; 192/114 R
[58] Field of Search ............... 376/235, 228, 232, 242, 376/271; 192/46, 89 W, 114 R; 74/577 R, 577 S, 577 M

[56] References Cited

U.S. PATENT DOCUMENTS

| | | | |
|---|---|---|---|
| 1,387,972 | 8/1921 | Gauthier | 192/114 X |
| 1,874,651 | 8/1932 | Swift, Jr. | 192/114 X |
| 3,572,161 | 3/1971 | Lichtenberger et al. | 376/235 X |
| 3,608,691 | 9/1971 | Rosenberg | 192/114 X |
| 3,852,153 | 12/1974 | Maslenok et al. | 376/235 |
| 3,902,963 | 9/1975 | Bertone et al. | 376/235 X |
| 4,058,192 | 11/1977 | Haigh | 192/46 |
| 4,060,452 | 11/1977 | Acher | 376/235 X |
| 4,293,381 | 10/1981 | Goetzmann et al. | 376/235 X |
| 4,314,882 | 2/1982 | Etienne et al. | 376/235 |

FOREIGN PATENT DOCUMENTS

| | | | |
|---|---|---|---|
| 0093055 | 11/1983 | European Pat. Off. | 376/228 |
| 2605534 | 12/1976 | Fed. Rep. of Germany | |
| 2051600 | 4/1971 | France | |
| 2075928 | 10/1971 | France | |
| 2178783 | 11/1973 | France | |
| 2495814 | 6/1982 | France | 376/235 |

Primary Examiner—Deborah L. Kyle
Assistant Examiner—Dan Wasil

[57] ABSTRACT

Anti-ejection device for nuclear reactor control rod.

The reactor comprises a tight enclosure integral with the nuclear reactor vessel, the control rod being integral with the command bar. A system for manipulating the command bar comprises means for locking it. These means lock the command bar with respect to the tight enclosure for as long as the force exerted on this bar remains below a limit value. This limit value is at least equal to the force exerted on the command bar in the case of an accidental external cause urging the control rod to leave the reactor core. The device comprises means for obtaining a translation of the control rod, by exerting a force exceeding said limit value on the command bar.

6 Claims, 5 Drawing Figures

RELEASABLE ANTI-EJECTION DEVICE FOR THE CONTROL RODS OF A NUCLEAR REACTOR

BACKGROUND OF THE INVENTION

The present invention relates to a releasable anti-ejection device for the control rods of a nuclear reactor.

The mechanisms controlling the control rods of pressurized nuclear reactors are generally located in a pressure-resistant, tight enclosure. The pressure prevailing within this tight enclosure is equal to the pressure prevailing within the reactor, and is consequently several dozen bars.

If for any reason, the seal of such an enclosure is broken, there is a rapid depressurization, leading to a pressure difference between the interior of the enclosure and the interior of the reactor vessel. This pressure difference will lead to a considerable force on the control rods and its controlling mechanism and will have the tendency to eject the control rod from the reactor core.

Thus, pressurized nuclear reactors are equipped with devices for preventing the ejection of control rods, in the case of a depressurization of the enclosure containing the controlling mechanism causing these rods to leave the reactor core.

A large number of anti-ejection devices for nuclear reactor control rods are known. For example, mechanisms of this type are described in U.S. Pat. No. 4,314,882 issued Feb. 9, 1982 as well as in U.S. Pat. No. 3,241,653, filed on Oct. 5th 1971 by the Westinghouse Electric Corporation. Devices of this type comprise a mechanism for controlling the translation of the control rod located in a tight enclosure, integral with the reactor vessel cover, anti-ejection means with respect to the control rod and finally means for controlling the anti-ejection means, which are sensitive to some external cause tending to discharge the control rod from the reactor core.

However, one of the disadvantages of anti-ejection devices of this type is that they do not make it possible for the control rod to be removed from the reactor core when the anti-ejection means remain blocked.

SUMMARY OF THE INVENTION

The present invention relates to an anti-ejection device, which obviates these disadvantages. This device prevents the ejection of the control rod for as long as a force below a given value is not exerted on said rod. This limit value is determined as a function of forces liable to be exerted on the control rod in the case of an accidental external cause. However, if this anti-ejection mechanism remains in the blocked position, it is still possible to remove the control rod from the core by exerting on the command bar a force exceeding the limit value.

More specifically, the present invention relates to an anti-ejection device for a reactor comprising a tight enclosure integral with the nuclear reactor vessel, the control rod being fixed to the command bar, the manipulation system of the latter comprising means for locking the command bar with respect to the tight enclosure in the case of the control rod being urged to leave the reactor core, wherein the means for locking the command bar with respect to the tight enclosure lock it for as long as the force exerted thereon remains below a limit value, which is at least equal to the force exerted on the command bar in the case of an external accidental cause urging the control rod to leave the reactor core, the device comprising means for obtaining a translation of the control rod by exerting a force exceeding this limit value on the command bar.

It is also known that there are a large number of command or controlling mechanisms for the control rod. These mechanisms are generally controlled by a rotary system, whose movement can be transformed into a linear displacement by a nut-screw or pinion-rack means making it possible to lower the command bar, so that it penetrates the core, or conversely raise it to remove it from the core.

Controlling mechanisms of the nut-screw type can be subdivided into two main groups, namely those in which the screw, which is fixed in translation, is rotated and the nut, which is fixed in rotation, is free in translation, and those in which the screw is fixed in rotation and the nut which is fixed in translation, is actuated in rotation.

The present invention more specifically relates to an anti-ejection device preventing the unexpected raising of the control rod, which is located between the rotary control system and the mechanism transforming the rotational movement into a translational movement.

The force exerted on the nut-screw controlling mechanism of the first or second types is a torque, so that throughout the remainder of the text, the term force will be used to describe either a stress or a torque.

In the case of the construction of an anti-ejection mechanism equipping e.g. a rotary screw-type mechanism, the command bar is mobile in rotation and the anti-ejection device has means for locking said command bar in rotation with respect to the tight enclosure, provided that the torque exerted is below a limit value, which is at least equal to the torque exerted on the command bar in the case of a depressurization urging the control rod to leave the reactor core. By exerting on said command bar, a torque which exceeds this limit value, it is still possible to bring about the translation of the control rod.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
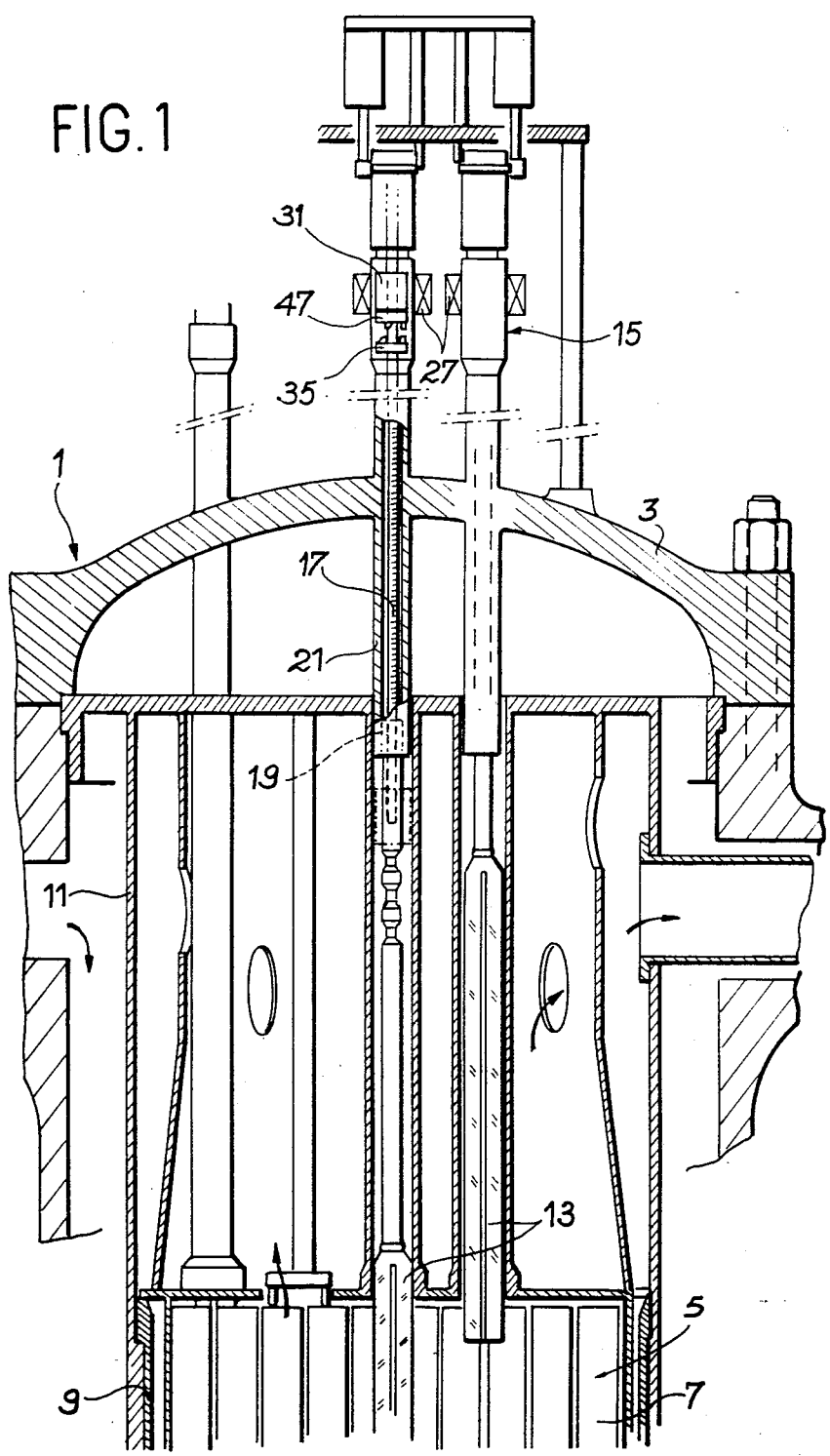
FIG. 1 a sectional view of a nuclear reactor equipped with an anti-ejection device according to the invention.

FIG. 1 shows the upper part of a pressurized water nuclear reactor vessel 1, which is sealed by a cover 3. Within the vessel is located the core, which is constituted by fuel assemblies, such as 7, placed within a ferrule 9.

Within the vessel and above the core, there is a supporting structure 11 for components housed in the reactor and through which move vertically the control rods 13, which are introduced to a greater or lesser depth into core 5. Each of the control rods 13 is connected in its upper part to a translation control device, disposed within a tight enclosure 15, integral with cover 3.

This control device, constructed in accordance with the invention, makes it possible to prevent the ejection of a control rod 13 in the case of an accident, which tends to discharge it from core 5. However, it also makes it possible to raise the control rod, if the anti-ejection device accidentally remains in the locked position.

It is known that numerous control rod controlling devices already exist. The embodiment described relative to FIGS. 1 to 5 is a nut-screw control mechanism. Nut 19 is locked in rotation and guided in translation in tube 21. Screw 17 is driven in rotation by a command bar 23, which can be seen in FIG. 2.

Figure 2:
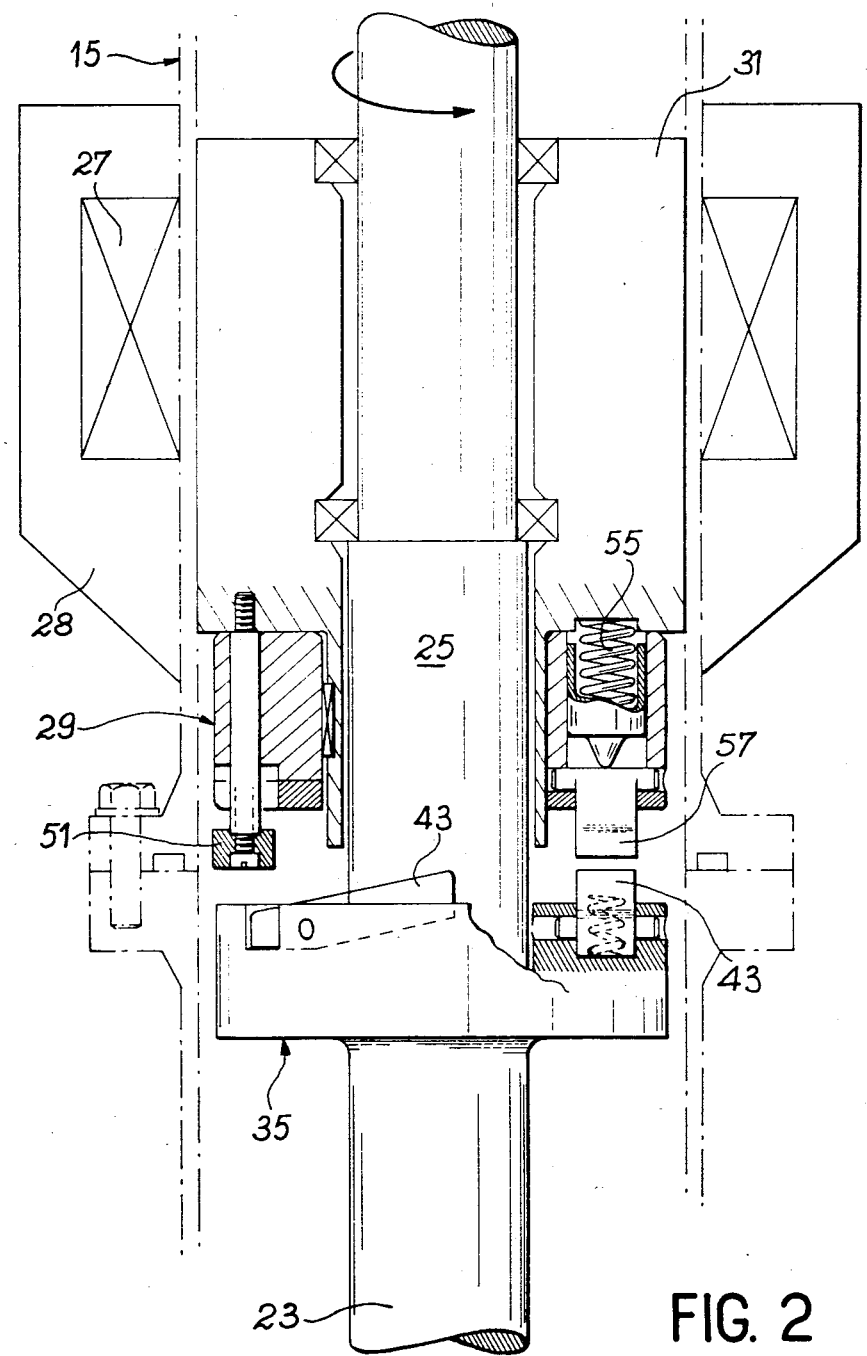
FIG. 2 a larger-scale sectional view of the anti-ejection mechanism of the invention.

As can be seen in FIG. 2, rotor 25 is integral with command bar 23. The rotor drive mechanism, which is at a higher level, is not shown. Thus, the rotation of rotor 25 makes it possible to drive the screw via command bar 23. Thus, the control rod 13 can be displaced in translation in a random manner.

The device also comprises a moving mass or weight 29. This weight can move in translation along rotor 25 between two positions, namely an engaged position and a disengaged position, shown in FIG. 2.

The moving weight 29 is in the disengaged position, when there is a magnetic field, produced by coil 27. Thus, when coil 27 is energised, the electromagnetic attraction is exerted between frame 31 and moving weight 29 and engages the latter with the frame, which leads to the disengaged position shown in FIG. 2.

Conversely, when this electromagnetic attraction ceases, the moving mass is displaced by return springs 55, only one being shown in FIG. 2, in such a way that weight 29 moves close to the ratchet wheel 35, integral with drive rotor 25.

Figure 3:
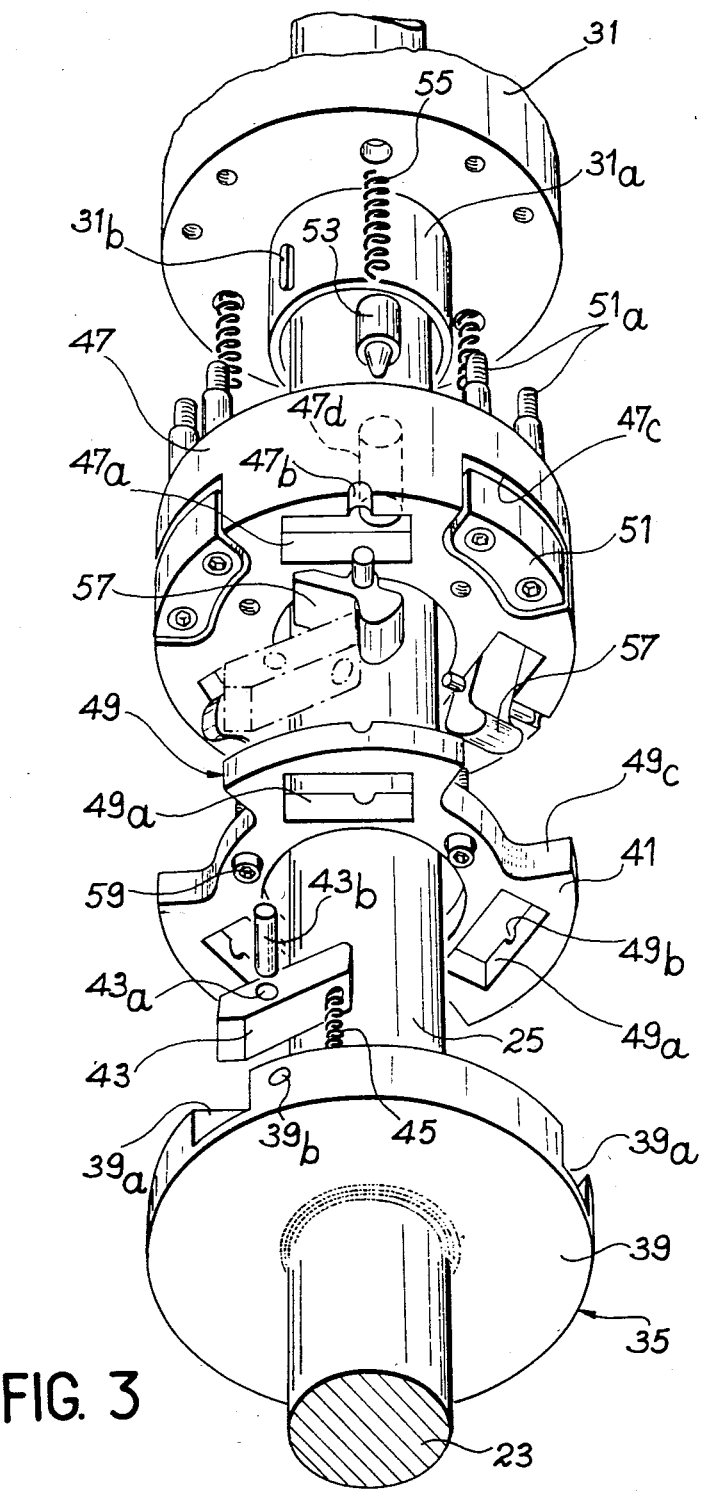
FIG. 3 an exploded view of the same mechanism.
Figure 4:
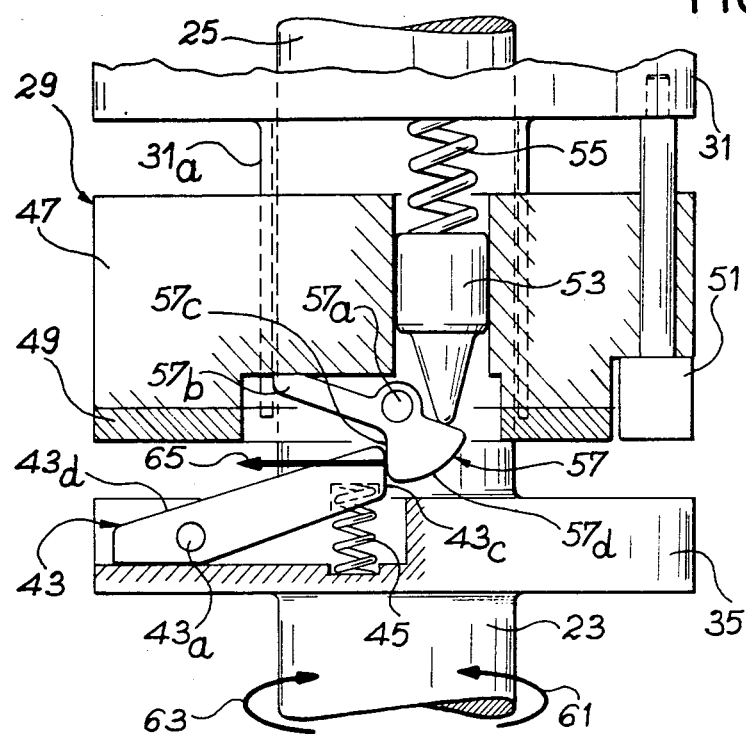
FIGS. 4 and 5 sectional views illustrating the operation of the anti-ejection device according to the invention.

As can be seen in FIGS. 3 and 4, ratchet wheel 35 has three cylindrical holes 39b, oriented perpendicularly to each of the slots 39a. Each pawl 43 has a hole 43a for its spindle 43b. The pawl has a front 43c and a back 43d and is displaced by a weak spring 45. As can be seen e.g. in FIGS. 4 and 5, when the pawl 43 is drawn back by spring 45, front 43c is oriented approximately along a line parallel to the axis of rotor 25. However, back 43d forms an acute angle close to 90° with front 43c.

The moving mass or weight 29 comprises a ring 47 and a moving mass cover 49. Ring 47 is an annular solid steel member, arranged around rotor 25. It can also be displaced in translation along sleeve 31a, integral with core 31. The ring is immobilized in rotation relative to sleeve 31a by a key 31b (cf FIG. 3).

Ring 47 has three rectangular openings 47a, at 120° from one another and used for ratchet 57. Perpendicular to opening 47a, there is a semicylindrical half-groove 47b for the ratchet pin. Ring 47 also has three cutouts 47c, arranged at 120° from one another and inserted between openings 47a. These cutouts are provided for stops 51, which are fixed to core 31 by two screws 51a. The stops 51 limit the downward displacement (in accordance with the orientation of FIG. 3) of ring 47.

Ring 47 also has three bores 47d, only one of which is visible, shown in dotted line form in FIG. 3. The bores are provided for push-buttons 53 having a return spring 55, said push-buttons acting on the ratchets.

Figure 5:
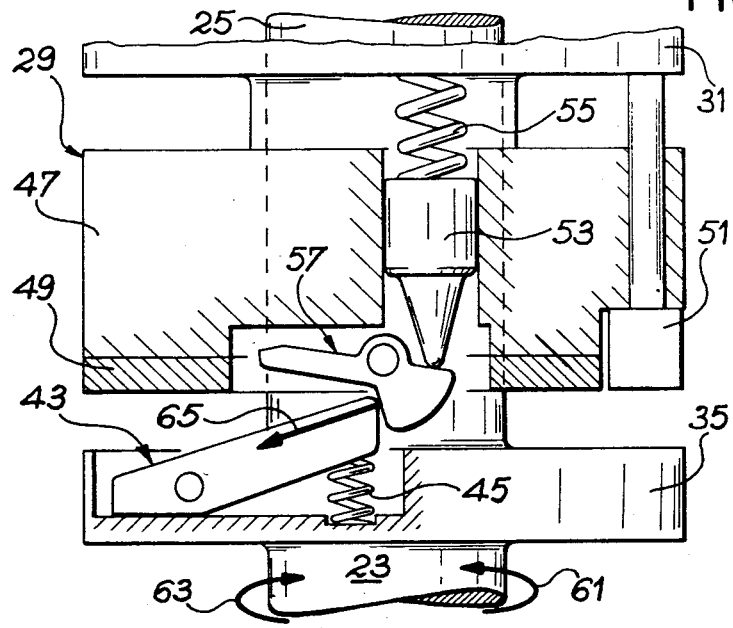

As can be seen in greater detail in FIGS. 4 and 5, each ratchet 57 has a pin 57a, which is fitted into groove 47b and into the corresponding groove 49b of the moving mass cover 49.

Ratchet 57 has a front 57c, which is substantially when its tail or shank 57b abuts against ring 47. Ratchet 57 pivots about a pin 57a, perpendicular to the axis of rotor 25. It is drawn back into the discharge position by return spring 55, whose tension is determined as a function of the limit torque value which is to be transmitted thereto. This spring is called a "strong return spring".

The moving mass cover 49 is in the form of a disk, having three rectangular openings 49a, corresponding to the openings 47a and which permit the pivoting of ratchets 57. On the upper face of the cover (in accordance with the orientation of FIG. 3), there are three grooves 49b further corresponding to the grooves 47b for the pins 57a of the ratchet. Finally, the cover has three cutouts 49c positioned between the openings 47a for the passage of three stops 51. Cover 49 is fixed to ring 47 by screws 59.

The device operates in the following way. The moving weight 29 can be moved between two positions, namely a disengaged position, as shown in FIG. 2, and an engaged position, as shown in FIGS. 4 and 5.

In the disengaged position, the electromagnetic flux circulates in the iron casing 29 surrounding coil 27 and in rotor 25, which attracts the moving weight 29 against core 31 and compresses springs 55. In this position, the ratchets are not engaged with pawls 43, as can be seen in FIG. 2. Thus, the drive rotor 35 is free in rotation in both directions. Thus, it is possible to raise or lower the control rods 13 at random, by means of a command device, which is independent of the anti-ejection system and not shown in FIG. 2.

When the electromagnetic flux stops circulating, the moving mass 29 advances, under the action of return spring 55, towards the drive rotor 35. Thus, the pawls 43 engage with ratchets 57. The travel of the moving weight 29 stops, when it comes into contact with stops 51, as shown in FIGS. 4 and 5. When the moving weight is in the engaged position, the operation of the device differs as a function of the envisaged rotation direction.

In the direction of arrow 61 (cf FIGS. 4 and 5) it is possible for drive rotor 35 to rotate. For this rotation direction, the sloping back 43d of the pawls comes into contact with the rounded back 57d of the ratchets. However, the pawls 43 are drawn back by springs 45, called weak springs, whose tension is determined in such a way that the pawls can easily be moved aside. Therefore, in the rotation direction indicated by arrow 61, the pawls 43 are moved aside without any force and rotation is possible, even for a relatively small torque. This rotation direction corresponds to the lowering of the control rod into the reactor core. Thus, when the moving weight 29 is in the engaged position, it is possible to lower the control rods into the reactor core without difficulty.

In the rotation direction indicated by arrow 63, there is a front-to-front contact between ratchets and pawls. More specifically, the substantially vertical front 43c of pawl 43 comes into contact with the also substantially vertical front 57c, when ratchet 57 is in the out position, as shown in FIG. 4. In this position, the contact reaction between ratchet and pawl is substantially perpendicular to the contact surface between the two members. This reaction is represented by arrow 65. As can be seen in FIG. 4, the moment with respect to the pivot pin 43a is exerted in the same direction as that caused by return spring 55. In view of the fact that the pawl is already in the out position, it cannot go any further and therefore remains stationary.

At this stage, two possibilities exist. In the first case, the torque transmitted by the command bar 23 is inadequate to compress the return springs 55. In this case, rotation of drive rotor 35 is prevented, because the moving weight is blocked in rotation relative to member 31 by key 31b and member 31 is itself locked in rotation relative to enclosure 15. This means that if any accidental external causes urges the control rod to leave the core, as the moving weight 29 is in the engaged position as shown in FIG. 4, any moveament of said rod is prevented. Thus, the tension of springs 55 is defined in such a way that the forces necessary for the tilting of the ratchets exceeds the forces for maintaining the latter in place. Obviously, the value of the tilting force must be determined as a function of these forces in an adequately precise manner. This prevents the ejection of the control rods.

In the second case, the torque transmitted by the command bar 23 is adequate to ensure the tilting of ratchets 57, which then pivot in the manner shown in FIG. 5. Under the effect of this pivoting, the reaction 65 of the ratchet on the pawl turns as the ratchet rolls without friction on the rounded edge of the pawl. Thus, the pivoting of the ratchet is accompanied by a succession of states of equilibrium of spring 55. In the position of FIG. 5, the reaction 65 is directed approximately towards the pivot pin 43a. This reaction then exceeds pin 43a, which reverses the direction of the torque exerted with respect to the said pin. As from a certain instant, the force exceeds that exerted by the weak return spring, thus creating an instability, in such a way that the pawl is rapidly moved aside.

Under these conditions, the final state of equilibrium obtained is that corresponding to the maximum retaining torque of the device. It is substantially independent of the friction coefficient between the materials of the pawl and the ratchet, in view of the fact that only rolling phenomena occur when contact takes place between them.

Thus, in this engaged position of moving weight 29, the control rods are maintained in the reactor core in the case of an external accident urging them to leave the latter. However, it is still possible to extract the control rods, if the moving weight fails to move in order to disengage the device.

Moreover, the limiting torque does not vary as a function of the friction coefficients of the materials of the ratchet and the pawl and consequently as a function of the temperature of the reactor fluid in which these members are immersed.

I claim:

1. In a nuclear reactor comprising a vessel, a core within said vessel and at least one pressure-tight enclosure integral with said vessel, said reactor also comprising at least one command bar pivotedly supported within said enclosure, drive means connected to said command bar, and a control rod connected to said drive means, a motor for rotating said command bar in a first direction for moving said control rod out of said reactor core, said motor also rotating said command bar in a second direction for moving the control rod in the reactor core, an anti-ejection device for said control rod, comprising locking means for rotationally locking said command bar with respect to said enclosure in said first direction, said locking means being supported with respect to said enclosure through calibrated elastic means, said elastic means being operable to flex when a torque exceeding a predetermined value is exerted by said motor on the command bar in said first direction.

2. The device of claim 1, wherein said drive means comprise a screw integral with said command bar, a nut engaging with said screw and locked in rotation with respect to said enclosure, said control rod being integral with said nut.

3. In a nuclear reactor comprising a vessel, a core within said vessel and at least one pressure-tight enclosure integral with said vessel, said reactor also comprising at least one control rod, a command bar fixed to said at least one control rod, and a manipulation system of said command bar, said manipulation system exerting a force on said command bar to move in and out of the reactor core, an anti-ejection device for said control rod, said device comprising means for locking said command bar with respect to said pressure tight enclosure as long as a force exerted on said command bar remains below a limit value, which is at least equal to the force exerted on the command bar in the event of an accidental cause such as a failure of said pressure tight enclosure urging the control rod to leave the reactor core, said device further comprising a rescue manipulation system of the control rod to exert a drive force on said command bar, said drive force exceeding said limit value and said means for locking the command bar with respect to the pressure tight enclosure being constituted by at least one pawl mounted so as to pivot about a pin positioned in a plane perpendicular to an axis of the command bar, said pin being fixed to the command bar and the pawl being drawn back into an out position by a so-called weak return spring, the pawl having a front substantially parallel to the axis of the command bar and a back forming a large angle with the axis of said bar, at least one ratchet pivoting about a pin which is fixed in rotation with respect to the enclosure and located in a plane perpendicular to the axis of the command bar, said ratchet being drawn back into an out position by a return spring whose tension is determined as a function of the value of the limiting torque which it is desired to obtain, said return spring being a so-called strong return spring, the ratchet having a front substantially parallel to the axis of the command bar when said front is in abutment with said pawl front and a rounded back forming a small angle with the back of the pawl, said ratchet engaging with said pawl.

4. A device according to claim 3, wherein there are a plurality of ratchets and pawls and the ratchets are mounted in pivoting manner on a movable weight which is dispalceable in translation along a rotor integral with the command bar between an engaged position in which the ratchets engage with the pawls and a disengaged position in which the command bar can freely rotate in both directions.

5. A device according to claim 4, wherein the translation of the moving weight is controlled by means of a coil, creating an electromagnetic attraction force, the strong return springs of the ratchets also acting as return springs for moving the weight towards the rotor.

6. A device according to claim 3, wherein the command bar is mobile in rotation and comprises means for locking it in rotation with respect to the pressure tight enclosure for as long as the torque exerted is below the limit value, which is at least equal to the torque exerted on the command bar in the event of an accidental cause urging the control rod to leave the reactor core, the device comprising means for obtaining a translation of the control rod by exerting on the command bar a torque exceeding this limit value.

* * * * *